March 29, 1966  H. P. CHABRIER ETAL  3,242,946
VALVES ACTUATED BY FLUID UNDER PRESSURE
Filed April 29, 1963
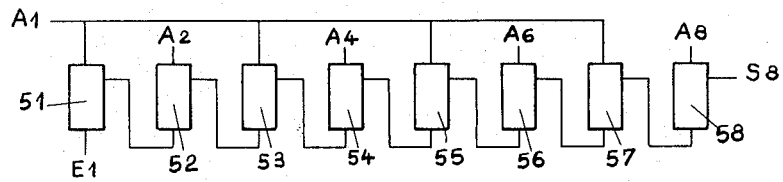
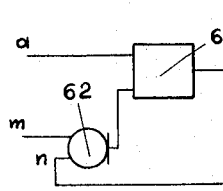
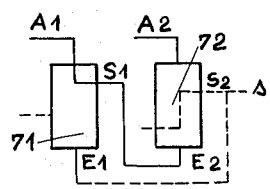
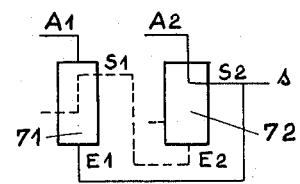
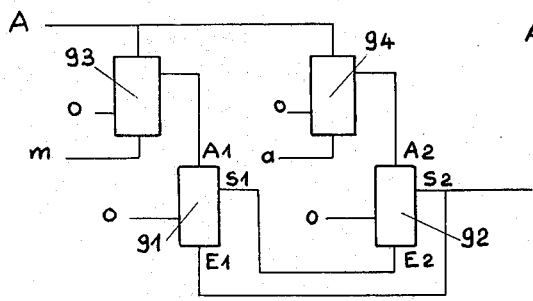
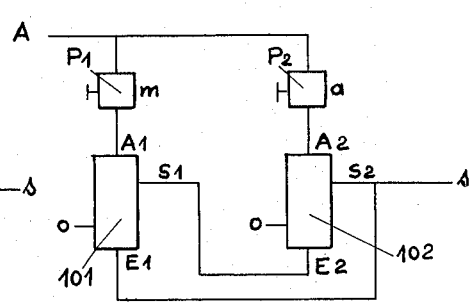
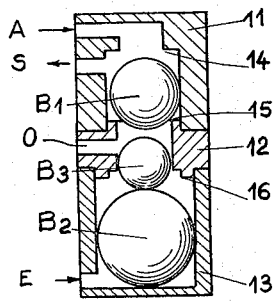
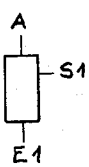
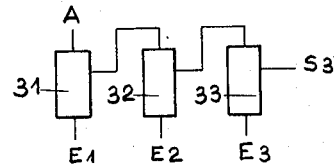
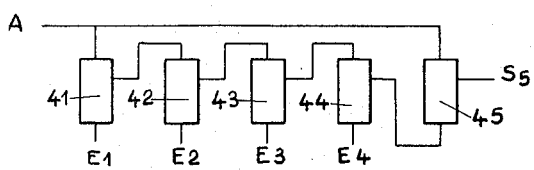

United States Patent Office 3,242,946
Patented Mar. 29, 1966

3,242,946
VALVES ACTUATED BY FLUID UNDER PRESSURE
Henri Pierre Chabrier and André Saint-Joanis, Lyon, France, assignors to Société d'Electro-Chimie, d'Electro-Metallurgie et des Acieries Electriques d'Ugine, a corporation of France
Filed Apr. 29, 1963, Ser. No. 276,565
Claims priority, application France, May 4, 1962, 896,501; Nov. 13, 1962, 915,236; Dec. 14, 1962, 918,673
1 Claim. (Cl. 137—625.65)

This invention relates to valves actuated by liquids or gases under pressure.

A major purpose of the present invention is to provide a valve which is particularly adapted for use as a logical element.

Various types of hydraulic or pneumatic valves are known including, in particular, valves of the type comprising a hollow body having orifices in communication with lines which deliver fluid under pressure supplied from external sources, and at least one member adapted to move within the hollow body and co-operating with seatings of the hollow body to close the passageway from one orifice to the other. The displacement of the movable member, controlled by the fluid pressure or by other means, thus modifies the connections between the lines and causes the device to adopt at least two distinct operating positions.

However, these previously known hydraulic and pneumatic valves and selectors are not well adapted for use as logical elements. Moreover, in spite of their intrinsic qualities, their comparatively complex and expensive manufacture and other drawbacks have prevented until now their successful competition with electronic logical elements.

Therefore, it is an object of the present invention to provide an improved fluid actuated valve, of the general type as defined hereinabove, which is particularly adapted for constituting a remarkably versatile logical element of simple design and manufacture.

According to the invention, there is provided a fluid actuated valve including a hollow body having at least four orifices preferably, at least one of these orifices communicating with means for delivering fluid under a constant reference pressure, and at least three seatings co-operating with means for controlling the fluid flow between said orifices.

It will be shown hereinafter that such a valve which provides two well-defined pressure output levels and is apt to give the logical NOT function, is adapted for use as a basic element, which will be assembled with similar elements for performing the logical functions NOT, NOR, AND, OR.

According to another aspect of the present invention, a fluid actuated valve comprises a hollow body defining at least four serially connected chamber portions arranged for allowing the passage of the fluid from any chamber portion to the adjacent chamber portions, each chamber portion having an orifice communicating with an inlet or outlet line, at least three seatings arranged normally to the path of the fluid through the respective chamber portions, and movable means each co-operating with one of said seatings for preventing the flow of the fluid from one chamber portion to an adjacent chamber portion.

The various objects and advantages of this invention will become clearly apparent from the following description and the appended drawings.

In the drawings:

FIG. 1 is a sectional illustration of the valve constituting the present invention.

FIG. 2 illustrates a logical NOT circuit constituted by means of such a valve.

FIG. 3 shows a three-input NOR gate.

FIG. 4 illustrates a four-input OR gate.

FIG. 5 shows a six-input AND gate.

FIG. 6 is a block diagram of a memory unit.

FIGS. 7 and 8 illustrate in rest position and in operating position a memory unit essentially consisting of two valves of the type shown in FIG. 1.

FIGS. 9 and 10 illustrate variations of such a memory unit.

Referring specifically now to the drawings and in the first instance to FIG. 1, there is shown a selector valve including three balls $B_1$, $B_2$ and $B_3$, movable within a hollow body. The latter, in the embodiment shown in FIG. 1, comprises three distinct parts 11, 12 and 13, which are assembled together.

It may be considered that the inner cavity of the hollow member 11–12–13 includes a first chamber portion provided with a first orifice A, a second chamber portion, provided with a second orifice S, a third chamber portion provided with a third orifice O, and a fourth chamber portion provided with a fourth orifice E.

The orifice A admits, for instance, a supply fluid pressure $P_A$; orifice E admits a control or signal pressure $P_E$; orifice O, for instance, opens onto the atmosphere, or communicates with any other means for defining a constant reference pressure level, this level being the lowest one of the fluid pressure levels applied to the various orifices of the valve. At the orifice S a fluid pressure $P_S$ will be obtained.

The first and second chamber portions communicate with one another through a seating 14, which is closed by ball $B_1$, adapted for this purpose. The second and third chamber portions communicate with one another through a seating 15, which is closed by ball $B_1$, in the position as illustrated in FIG. 1. The third and fourth chamber portions communicate with one another through a seating 16, for the closing of which ball $B_2$ is adapted. Ball $B_3$ does not close any seating but transmits to ball $B_2$ the force exerted on ball $B_1$, and vice versa.

Now let $q_1$ and $q_2$ be the major sectional areas of the respective balls $B_1$ and $B_2$; $Q_2$ the section of seating 16; $Q_1$ the section of seating 14; $Q_0$ the section of seating 15.

It follows that $q_1 > Q_2$; $q_1 > Q_1$; $q_1 > Q_0$.

A simplified theory of the operation of the device shown in FIG. 1 will be set forth the starting position being as illustrated in FIG. 1, the control pressure $P_E$ is gradually increased starting from an initially selected fluid pressure value.

When $$\frac{P_E}{P_A} = \frac{Q_0}{q_2}$$

at first approach, the force exerted by $P_E$ on ball $B_2$ balances the force exerted by $P_A$, while forcing the ball $B_1$ on to seating 15.

If it is supposed that $$\frac{P_E}{P_A} > \frac{q_1}{q_2}$$

the result is that as soon as ball $B_1$ hs stopped closing seating 15, this ball will move, and provided that $$\frac{P_E}{P_A} > \frac{Q_1}{Q_2}$$

ball $B_1$ will close seating 14 at the same time as ball $B_2$ will then close seating 16.

For this purpose it will be sufficient to carefully select the height of the body part with respect to the diameter of ball $B_3$.

The operation of the device may be summarized by means of the following table:

| A | E | S | |
|---|---|---|---|
| 0 | 0 | 0 | |
| 0 | $P_E$ | 0, with $P_E = P_A \cdot \dfrac{Q_1}{Q_2}$ | |
| $P_A$ | $P_E'$ | 0 | |
| $P_A$ | 0 | $P_A$ | $P_E' > P_E$ |

Pressure $P_A$ is admitted to output passageway S only if the inlet A is supplied and if inlet E is not submitted to a fluid pressure exceeding $P_A \times Q_1/Q_2$.

In other words, the arrangement of FIG. 1 performs the function $S = a \times \bar{e}$.

When permanently supplied with a constant fluid pressure at A, which may be considered as binary level 1, the arrangement performs the NOT function $$S = \bar{e}$$

FIG. 2 illustrates such a logical NOT circuit in which E denotes the input signal, S the output signal and A the supply.

In FIGURES 2 to 10, the reference A without index, located opposite an inlet, means that this inlet is continuously under pressure.

The expansion orifices O are not illustrated.

FIG. 3 illustrates a gate performing the three-input NOR function. Such a gate comprises three units as shown in FIG. 2, respectively denoted 31, 32, 33, and having three respective signal inputs $E_1$, $E_2$, $E_3$. The output of unit 31 is connected to the supply input of unit 32, whereas the output of the latter is connected to the supply input of unit 33, the latter having in turn an output $S_3$.

It will be easily understood that the operation of the device is represented by the equation:

$$S = a \times \bar{e}_1 \times \bar{e}_2 \times \bar{e}_3 \text{ with } a = 1$$

FIG. 4 illustrates a gate performing the four-input OR function. Such a gate comprise five units as shown in FIG. 2, respectively denoted 41 to 45, and having four respective signal inputs $E_1$ to $E_4$. The output of unit 41 is connected to the supply input of unit 42, whereas the output of the latter is connected to the supply input of unit 43. The output of the latter unit is in turn connected to the supply input of unit 44, whereas the output of unit 44 is connected to the signal input of unit 45. The supply A is connected to the respective supply inputs of units 41 and 45. Unit 45 has an output $S_5$ which is the output of the whole arrangement.

It will be easily understood that the operation of the device is represented by the equation $$S_5 = a \times (\underline{e}_1 + \underline{e}_2 + \underline{e}_3 + \underline{e}_4) \text{ with } a = 1$$

FIG. 5 illustrates an embodiment of a gate performing the six-input AND function. Such a gate comprises eight units, as shown in FIG. 2, respectively denoted 51 to 58. The output of each of the units 51 to 57 is connected to the signal input of the corresponding following unit. The supply inputs of the odd numbered corresponding units are connected to the supply $A_1$, whereas the supply inputs $A_2$, $A_4$, $A_6$, $A_8$ of the units with even numbers remain unconnected. The device has a signal input $E_1$ and a signal output $S_8$.

It will be easily understood that the operation of the device is represented by the equation:

$$S_8 = a_1 \times e_1 \times a_2 \times a_4 \times a_6 \times a_8$$

As is well known, any logical sequence, as complex as it may be, may always be expressed in terms of logical functions NOT, NOR, AND, OR. By suitably grouping the logical units of the types as illustrated in FIGS. 2 to 5, whatever logical sequence may be provided for.

The valve as constituted by the invention, moreover, is apt to provide a memory unit.

As is known, a memory unit is a bistable device performing the change of a fugitive signal $(m)$ into a permanent one $(s)$. It is possible to cancel the latter by means of a priority fugitive signal $(a)$.

The corresponding logical equation in the Boolean notation, is $S = a(m+n)$, with $(n)$ identical to $(s)$.

The meaning of this is that signal $(s)$ exists if $(a)$ exists at the same instant as $(m)$ or $(n)$.

FIG. 6 is a block diagram of a memory unit including an AND circuit 61 and an OR circuit 62, the operation of which conforms to the above description.

According to this invention a memory unit will preferably consist of an even number—and particularly of two—fluid actuated valves of the type as illustrated in FIG. 1, the inlet $E_n$ of any one of the valves being connected to the outlet $S_{n-1}$ of the preceding one, and the inlet $E_1$ of the first valve being fed back from the outlet $S_n$ of the last one, the respective fluid supplies of the valves being connected in parallel within two groups each including an odd member of consecutive valves, the first group being fed under a constant fluid pressure, exception made for the instant of application of the fugitive signal $(m)$, the second group being fed under a constant fluid pressure, except for the instant of application of the fugitive cancelling signal $(a)$.

As an example, FIGS. 7 and 8 illustrate the operation of such a memory unit consisting of two valves 71 and 72, the lines under pressure being indicated in continuous line and those not under pressure in broken line.

In FIG. 7 the memory is at rest, elements 71 and 72 are fed in $A_1$ and $A_2$; no signal whatsoever is put at S.

In FIG. 8, a fugitive signal $(m)$ being applied to the valve 71 in the form of a short interruption in the supply $A_1$, the system has turned over and now delivers in S a permanent output signal fed by $A_2$, although the supply $A_1$ has gone back to normal. This signal will only be cancelled when the priority cancelling signal $(a)$ is applied to the valve 72 in the form of a short break in the supply $A_2$ of the valve 72, which will reset the system to the state illustrated in FIG. 7.

The operation of a memory including an even number of valves higher than two, is similar to that of the one just described. Each of the two fluid supplies $A_1$ and $A_2$ is connected in parallel across an odd number of consecutive serially connected valves.

Such memory units may be employed each on their own or may be comprised in logical complex circuits or control circuits.

As a first example, FIG. 9 illustrates a memory unit with two valves 91 and 92, wherein the signals $(m)$ and $(a)$ are applied in the form of a short turn-over of a third and a fourth valve, 93 and 94 respectively, these two valves being identical to the two first ones and connected as shown.

A second example is illustrated in FIG. 10. Signals $(m)$ and $(a)$ are generated by means of push-buttons $P_1$ and $P_2$ interrupting and connecting to the atmosphere the respective fluid supplies $A_1$ and $A_2$ of the valves 101 and 102 of the memory unit. In this arrangement the two push-buttons are "self-sustained."

The above disclosed applications of the valve constituting the invention are in no way limitative.

Apart from its economical manufacture, the possibility of its miniaturization, and its facility to provide complex logical circuits, the logical element according to this invention possesses a certain number of remarkable properties.

First of all it is to be emphasized that in its construction a certain clearance will generally be admitted systematically between balls $B_1$ and $B_2$ and the corresponding portions of the hollow body (11 and 13 respectively).

This clearance entails leakages during the transient states corresponding to the turn-over from one stable state to the other. This provides a rapid return of the pressures towards the reference pressure level, thus reducing the reset time of the device.

It is to be understood that there should be no leakage whatsoever when the device has attained one of its stable states; this condition is met with in the structure illustrated in FIG. 1 and in the variations described hereinafter.

As the clearance ratio needs no precise definition an accurate machine-finishing of the parts of the device is not needed, which considerably cuts down the manufacturing cost.

Devices according to the present invention may be either pneumatic or hydraulic. In the latter case, the outlets will have comparatively small cross sections in order to restrict the output liquid flow.

It is further observed that the devices may suitably operate with different fluids respectively applied in A and E, for instance. In this case it is obvious that the clearance as mentioned above has to be eliminated or adapted conveniently in order to avoid mixing the fluids during the turn-over.

It will be observed that no external reset means whatsoever are necessary for the resetting of the arrangement of FIG. 1 and that no loss of pressure of the fluid is necessary for the operation thereof.

Moreover, referring particularly now to FIG. 1, it may be seen that the valve constituting the invention may perform an amplifying function, on the condition, however, that $$P_E Q_2 > P_A Q_1$$

Thus it is possible to vary in a wide range the power output provided by the device.

As far as the practical embodiment of the arrangement is concerned, several variations may be considered. The arrangement may consist of an assembly of parts, obtained either by machine-finishing or by molding. The seats of the movable members may be made integral with the hollow body or may be detachable therefrom. In the last case they may consist of a flexible material.

The movable elements may consist of balls, cones, pyramids, etc., in conformity with the shape of the seats.

The fluids utilized, in liquid or gaseous form, may have any viscosity, as the latter hardly has any influence on the operation of the device.

When used as a logical circuit element, the valve will operate under the action of the resultant of the sole pressure forces applied to the orifices. However, in other applications of the valve the input signal may also be applied by means of a push-button or the magnetic core of a solenoid directly acting on one of the movable members.

What is claimed is:

A fluid-actuated logical NOT circuit including a hollow body having a chamber therein, said chamber comprising at least first, second, third and fourth mutually adjacent chamber portions having, in the walls thereof, first, second, third and fourth passageways serially arranged in said chamber, respectively, said first and fourth passageways being fluid inlet passageways, said second passageway being an outlet passageway; means, in communication with said third passageway, delivering fluid under a constant reference pressure, said third chamber portion separating said first and fourth chamber portions; a pair of oppositely disposed valve seats in said second chamber portion, a valve seat at one end of said fourth chamber portion opposite said fourth passageway, at least two spherical valve closing members movable in said second and fourth chamber portions and adapted to seat against said seatings for closing the communication between the respective chamber portions; means connected to said first passageway for providing a binary one fluid pressure level; means connected to said third passageway, for providing a binary zero fluid pressure level and means, connected to said fourth passageway, for providing an input signal fluid pressure level, and means between but separate from the valve closing members to limit movement thereof towards each other to prevent seating of the valve members simultaneously on adjacent of the seatings.

References Cited by the Examiner

UNITED STATES PATENTS

| | | | |
|---|---|---|---|
| 2,887,125 | 5/1959 | Lucien | 137—625.27 X |
| 2,985,141 | 5/1961 | Gustafson | 251—30 X |
| 2,991,805 | 7/1961 | Page | 137—625.27 |
| 3,057,551 | 10/1962 | Etter | 137—625.48 X |
| 3,070,295 | 12/1962 | Glattli | 137—112 X |

MARTIN P. SCHWADRON, *Primary Examiner.*